(12) United States Patent
Kullborg et al.

(10) Patent No.: US 6,408,710 B1
(45) Date of Patent: Jun. 25, 2002

(54) INDUSTRIAL ROBOT HAVING CONVECTION COOLED FREQUENCY CONVERTERS

(75) Inventors: Ove Kullborg; Einar Myklebust, both of Västerås (SE)

(73) Assignee: ABB AB, Vasteras (SE)

( * ) Notice: Subject to any disclaimer, the term of this patent is extended or adjusted under 35 U.S.C. 154(b) by 644 days.

(21) Appl. No.: 09/069,192

(22) Filed: Jan. 15, 1998

Related U.S. Application Data

(63) Continuation-in-part of application No. 08/604,465, filed on Feb. 21, 1996, now abandoned.

(30) Foreign Application Priority Data

Feb. 24, 1995 (SE) .............................................. 9500683

(51) Int. Cl.[7] .............................................. B25J 13/00
(52) U.S. Cl. ......................... 74/490.03; 310/64; 901/23
(58) Field of Search ................... 74/490.03; 310/68 R, 310/64; 901/23, 24; 414/729; 361/704

(56) References Cited

U.S. PATENT DOCUMENTS

| | | | | |
|---|---|---|---|---|
| 4,552,505 A | * | 11/1985 | Gorman ....................... 901/23 |
| 4,668,898 A | * | 5/1987 | Harms et al. .............. 310/68 R |
| 4,789,296 A | * | 12/1988 | Bergman et al. ............... 901/23 |
| 4,963,778 A | * | 10/1990 | Jensen et al. .............. 310/68 D |
| 5,006,744 A | * | 4/1991 | Archer et al. ............. 310/68 R |
| 5,103,149 A | * | 4/1992 | Kimura et al. ................ 901/20 |
| 5,497,289 A | * | 3/1996 | Sugishima et al. ......... 361/709 |

* cited by examiner

Primary Examiner—William C. Joyce
(74) Attorney, Agent, or Firm—Dykema Gossett PLLC

(57) ABSTRACT

An industrial robot comprises a manipulator body structure having a plurality of drive mechanisms for driving the various movements of the robot, and control equipment for controlling and driving the drive mechanisms. Each drive mechanism comprises an electric driving motor and reduction gear. Each control equipment comprises a rectifier and a drive device operatively connected to each driving motor. Each of the drive devices is mounted only on selected areas of the body structure other than the motors, and each of the drive devices is spaced a predetermined distance from its respective motor to which it is operatively connected. The robot body structure thereby functions to absorb the waste heat generated by the drive devices, to spread the waste heat therethroughout, and to transfer the waste heat solely by convection to the ambient air.

2 Claims, 2 Drawing Sheets

INDUSTRIAL ROBOT HAVING CONVECTION COOLED FREQUENCY CONVERTERS

RELATED APPLICATION

This application is a continuation-in-part of Ser. No. 08/604,465 filed Feb. 21, 1996 now abandoned.

BACKGROUND OF THE INVENTION

This invention relates generally to an industrial robot comprising a manipulator body structure of articulated members, drive means for effecting movement of the members, each such drive means comprising at least one electric driving motor, and control equipment means for driving and controlling each of the drive means, such control equipment comprising a rectifier and a drive device in the form of a frequency converter for each drive means. More particularly, each of the drive devices are mounted only on selected areas of the manipulator body structure, and are spaced predetermined distances from their respective drive means, such that the body structure functions to absorb the waste heat generated by the drive devices and to transfer the waste heat solely by convection to the ambient air.

An industrial robot, or manipulator, to which the present invention is directed has a stand which is rotatably mounted on a foot member fixed to a base plate and which supports a first robot arm which is rotatable relative to the stand. A second robot arm is rotatably journalled at the outer end of the first arm. This second arm is rotatable about its central longitudinal axis and supports, at its outer end, a robot hand which is provided with a tool attachment and which is rotatable in two degrees of freedom relative to the second arm. Drive means is arranged at each axis to effect movement of the robot arms and hand about their axes. Each such drive means comprises a motor, such as an inverter-fed synchronous motor with permanent magnets in the rotor, and a reduction gear with a high gear ratio.

Power supply and control of an industrial robot of the aforedescribed type are typically provided via control equipment comprising a rectifier and a drive device provided for each drive unit. The rectifier converts a three-phase line voltage into a direct current which is supplied to the drive devices. The drive devices are controlled by signals from the control equipment and thereby convert the direct current into a variable alternating current for driving motors of the industrial robot. The variable alternating current is preferably within the frequency range of 0 to 400 Hz. The alternating current is created by chopping the direct current, thus producing a pulse train formed of pulses with a variable length and polarity, the purpose of such pulse train being to imitate a sinusoidal alternating current. During such conversion from direct current to alternating current by so-called switching, high-frequency (MHz) transients are created which are superimposed on the fundamental frequency. These transients cause the cable to emit electromagnetic waves, which may disturb other equipment.

The principle of a drive system for an industrial robot according to the prior art is illustrated as a circuit diagram in FIG. 1. Six drive means 1a to 1f, each comprising its own AC motor 2a to 2f and its own reduction gear 3a to 3f, are mounted on the manipulator. Motors 2 are each connected, via long conductors, to separate drive devices 5a to 5f located in a control cabinet (not shown) spaced some distance from the industrial robot. Drive devices 5, which function to convert direct current into a controllably variable alternating current, are supplied with direct current from a rectifier 6, typically common to all drive devices and located in the control cabinet.

The control equipment with the rectifier and the drive devices is normally housed in the control cabinet located outside the operating range of the robot. For driving the robot, a multi-conductor cable, with the number of conductors required for each drive unit, is provided between the control cabinet and the robot. The cable is connected to the robot foot and, from there, branches out to the different drive means, which are usually located on the stand and on the second arm. Each of the six AC motors requires three conductors, such that the cable comprises 18 conductors. One problem with such a power transmission is that the total length of conductors are considerable and, therefore, costly. Another problem is that the long conductors increase the emission of the high-frequency electromagnetic waves, which also increases the risk of disturbance.

The drive devices develop increased heat during operation. Each of the drive devices comprises a number of electronic components which can stand heat of up to about 70° C. Beyond that temperature the drive devices may become damaged. And, the industrial robot is often specified to operate in an environment of up to 50° C. The working temperature of the motor often reaches as high as 145° C., such that both the motor and drive device produce heat which must be conducted and dissipated away by convection to the air. If the environmental temperature is 50° C., then there is only another 20° C. before the drive device collapses.

When the drive devices are located in the control cabinet, as in the prior art, a cooling device such as a fan or fans must be arranged in that cabinet to maintain the temperature of the drive devices well below their maximum operating limit of about 70° C.

And, it is well known in the technology of electric motors to provide a fan on the motor axle for cooling, particularly for motors which run constantly at high speeds. However, for motors which do not run constantly at high speeds but at variable speeds, cooling by the use of a fan on the motor axle creates a problem. For low speeds the fan must have a large radius and large blades to produce sufficient cooling air flow. When the speed increases the fan tends to restrain the motor which renders it less efficient and noisier.

It is also well-known to arrange for separate cooling air flow for motors designed to operate at variable speeds. Typically a converter is located in an air flow channel so as to obtain sufficient cooling of both the motor and the converter. A motor without a fan and with no forced cooling will simply malfunction on overheating since both the motor and converter produce heat.

In an industrial robot to which the invention is directed, the motors are designed for high accelerations and have small rotor diameters. Most of the time the motors are not running or revolve very slowly to all of a sudden accelerate to very high speeds. A fan mounted on the rotor axle will thus have very little cooling effect, and besides the motor is sealed off to avoid contamination by airborne particles in the various operating environments. As there is no cooling air stream the temperature of the stator of the motor may reach as high as 145° C. For better acceleration performance, no additional loading such as a fan should be integrated with the rotor.

U.S. Pat. No. 4,963,778 to Jensen discloses a variable speed motor having a converter in which both the motor and converter are cooled by the rotor fan (see FIG. 5). In the FIG. 2 embodiment of Jensen the converter is sealed in a terminal box 28 and is cooled by a coolant introduced into the casing via a line 35 to absorb the dissipation heat. In FIG. 3 of Jensen terminal box 28 of the converter is provided with cooling ribs to increase the heat exchange surface of the terminal box to the ambient. In FIG. 4 of Jensen the casing of converter module 40 is situated close to the motor cover creating a free space for the flow of convection air.

The cooling of a converter or drive device of a motor which is unique to an industrial robot, is therefore lacking in the Jensen et al. U.S. Pat. No. 4,963,778 patent in which the problems attendant to robot motors requiring sudden accelerations to very high speeds are not solved much less even recognized by the art.

SUMMARY OF THE INVENTION

It is an object to the present invention to provide a power-supply system for an industrial robot which avoids the aforementioned drawbacks. Such power-supply system limits the emission of disturbing electromagnetic waves, reduces the amount of cables, and provides for efficient cooling of the drive devices. This is effected by locating the drive devices on the robot body structure itself, such that the waste heat developed by the drive devices is absorbed by the robot body structure, dissipates throughout the body structure or a portion thereof, and, by convection, is transferred to the surrounding air. From a rectifier in the control cabinet, the drive devices located on the robot body structure are supplied with direct current via one common power cable only. Alternatively, the rectifier may be located on the robot body structure such that the current supply by alternating current from the three-phase network can be connected directly to the robot. The power cables arranged between the drive devices and the drive means will therefore be extremely short, which greatly limits the emission of disturbing electromagnetic waves.

The drive means provided on the robot body structure at each of the axes about which the articulated members of the robot rotates, each comprises an electric motor capable of operating up to a predetermined maximum temperature. Control equipment means for driving and controlling each of the drive means includes at least one rectifier and drive devices each capable of withstanding heat generated up to a maximum temperature of approximately one-half the predetermined maximum temperature at which the motor is capable of operating. The drive devices are operatively connected to the respective motors and each of the drive devices is mounted only on selected areas of the robot body structure other than the motors. Moreover, each of the drive devices is spaced a predetermined distance from its respective motors to which the devices are operatively connected, such that the robot body structure functions to absorb the waste heat generated by the drive devices and to dissipate or spread the waste heat throughout the body structure, and to thereafter transfer the waste heat solely by convection to the ambient air.

More particularly, according to the invention, the drive devices may be mounted directly on the gear housing of each reduction gear that is formed as part of the drive means, such that the gear housing together with the lubricant within the housing function to absorb the waste heat generated by the drive devices so as to be thereby dissipated and to transfer the waste heat solely by convection to the ambient air.

Other objects, advantages, and novel features of the invention will become more apparent from the following detailed description of the invention when taken in conjunction with the accompanying drawings.

DETAILED DESCRIPTION OF THE INVENTION

Figure 1:
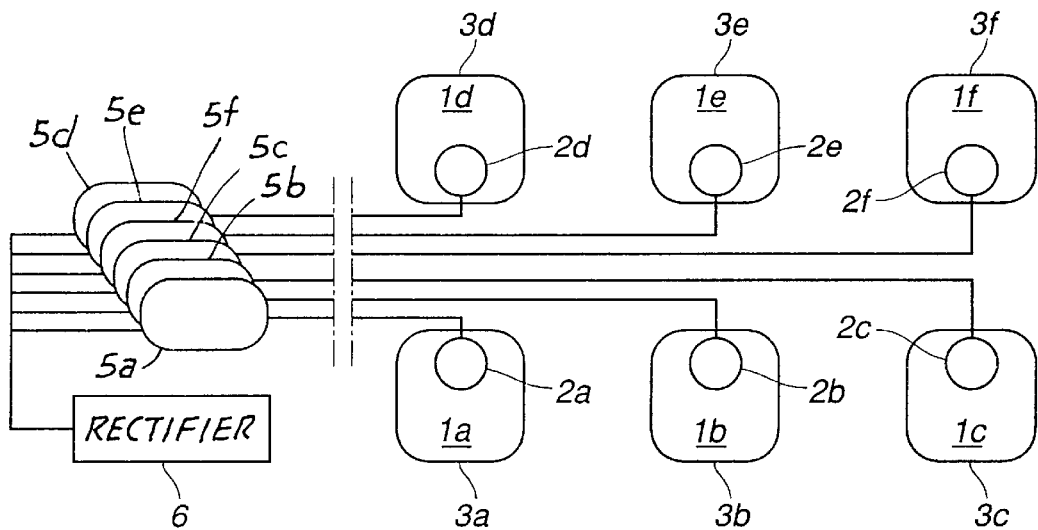
FIG. 1 is a circuit diagram illustrating a drive system for an industrial robot according to the prior art.
Figure 2:
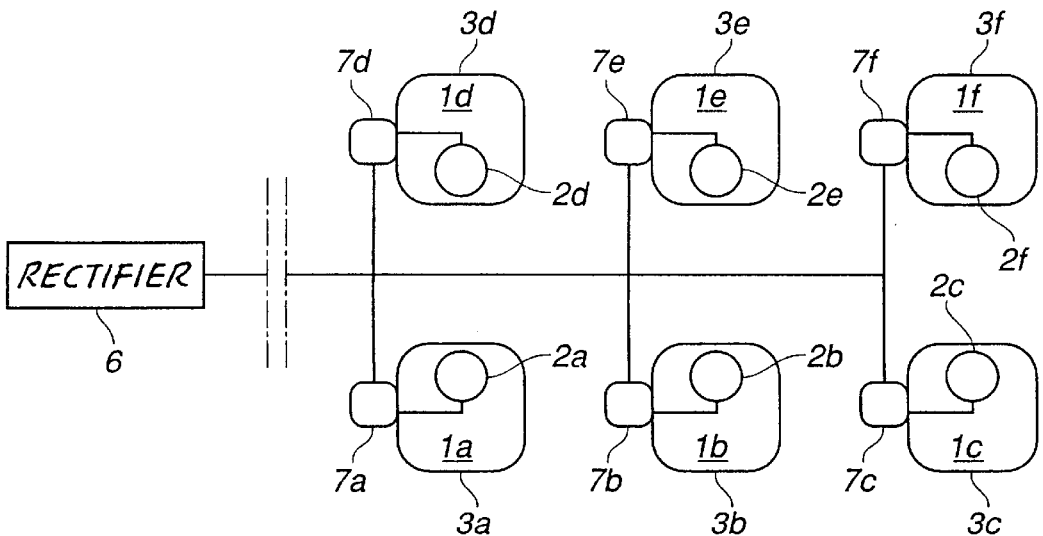
FIG. 2 is a circuit diagram of a drive system for an industrial robot according to the invention.

The circuit diagram according to FIG. 2 illustrates a drive system for an industrial robot according to the invention. Associated with each of the six drive means, each of which comprises an electric motor 2 and a reduction gear 3, is a drive device 7a to 7f mounted on the robot body structure itself as will be described in more detail hereinafter. A rectifier 6 common to all the drive devices is located in a control cabinet (not shown) such that only a two-conductor power cable jointly supplies direct current to the drive devices. Between the motor and drive device for the respective drive shafts, only short three-conductor power cables are connected, which greatly reduces the emission of disturbing electromagnetic waves. The rectifier can otherwise be located on the robot body structure itself in which case a mains cable can be connected directly thereto.

Drive devices 7, i.e., frequency converters, which function the same as the known drive devices 5, are mounted on the robot body structure itself so as to be efficiently cooled by thermal conduction of its waste heat to and convection from the robot body structure. A lower operating temperature of the drive devices (up to about 70° C.) makes it possible to chose less space-demanding electronic components and therefore the space required for housing the drive device may, compared to known drive devices, be maintained smaller. By suitable choice of components and by the elimination of any cooling flanges, space for housing the drive devices of about 60 mm×60 mm×40 mm may thus be obtained.

Figure 3:
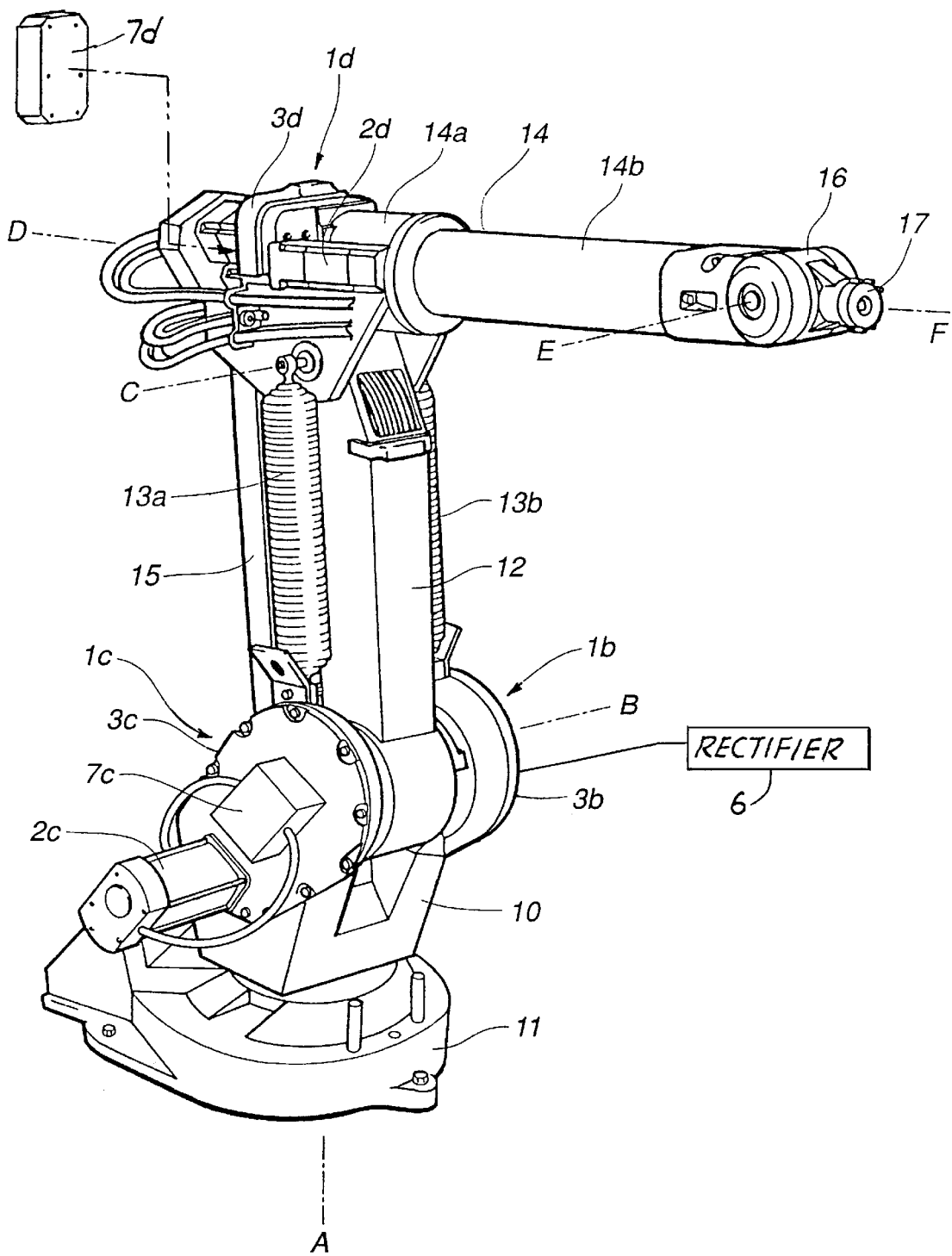
FIG. 3 is perspective view of an industrial robot incorporating the invention.

The industrial robot illustrated in FIG. 3 is of known construction having a stand which is rotatably journalled in a robot foot 11 fixed to a mounting base, the stand being capable of swinging about a vertical first axis A via a suitable drive means (not shown) located on stand 10. A first robot arm 12 is pivotally journalled in stand 10 for rotation about a second axis B and is balanced by two equalizer springs 13a, 13b, which are articulately fixed between stand 10 and the upper end of first arm 12. The lower end of first arm 12 is connected to a drive means 1b, which is integrated with stand 10 and which comprises a motor (not shown) and a reduction gear 3b which reduction gear is attached to the drive device (not shown). At the upper end of arm 12 a second robot arm 14 is pivotally journalled for rotation about a third axis C. The pivoting of arm 14 is carried out over a parallel link 15 the lower end of which is connected to a drive means 1c integrated with the stand and comprising an electric motor 2c, and a reduction gear means 3c which includes a gear casing covering a reduction gear operatively connected to a drive device 7c.

Second robot arm 14 comprises a rear part 14a, which is rotatable about third axis C, and a tubular front part 14b which is journalled in the rear part and is rotatable about the longitudinal fourth axis D of the arm. The outer end portion of the front arm part comprises a wrist having a wrist part 16, rotatable about a fifth axis E, and a tool attachment in the form of a rotating disc 17 which is rotatable about the longitudinal sixth axis F of the wrist part 16. Three drive means are mounted on rear part 14a of the second robot arm to respectively effect rotation of robot parts 14b, 16 and 17. Each of such drive means on second robot arm 14 comprises an electric motor and a reduction gear, and a drive device attached to a selected area of the robot body structure. Only motor 2d, reduction gear 3d, and drive device 7d, provided for driving arm 14b about fourth axis D, are shown in FIG. 3 in the interest of clarity.

Drive device 7c, provided for driving first arm 12 about second axis B is mounted directly on the casing of reduction gear 3c which is provided for effecting the movement. Drive device 7c, which is operatively connected with electric motor 2c, may however be mounted on any other selected area of the robot body structure other than drive means. Also drive device 7c, as can be seen in FIG. 3, is spaced a predetermined distance from its associated drive means 2c.

Similarly, drive device 7d arranged for driving arm 14 about fourth axis D, is mounted on the gear casing of reduction gear 3d which is provided for effecting the movement of the second arm. Again this drive device and the other drive devices provided in accordance with the invention but not otherwise shown in FIG. 3, associated with their respective electric motors, may be mounted to other preselected areas of the robot body structure other than any of the electric motors themselves. And, the drive devices are each spaced a predetermined distance from their respective drive means.

With such an arrangement, not only the thermal dissipation of the robot body structure but also the thermal conductivity of the oil enclosed in the gear casing is utilized to transfer the waste heat of the drive devices to the ambient air by convection. The heat developed in the drive device can best be rapidly absorbed by and spread into the entire limited surface of the gear housing. From the envelope surface of the gear housing, the heat is transferred to the ambient air by convection.

Although the drive means arranged at the rear part 14a of the second arm may require less power output, such that its associated drive device will develop less heat, all drive devices of the drive means at each of the axes provided to effect the respective rotative movements about such axes, are restricted in their location to selected areas of the robot body structure itself, other than the electric motors which are known to generate a working temperature as high as 145° C., approximately twice the maximum temperature of about 70° beyond which the electronic parts of the drive devices cease to function. The drive devices are spaced predetermined distances apart from their respective electric motors with which they are associated. And, use of such motors is sealed against the ingress of airborne particles which would interfere with the operation of the motors in the specific working environment. The electric motors therefore do not have any cooling fans or any other means establishing cooling ducts or passageways for the motors.

It should be pointed that the common rectifier of known systems provided in the control cabinet is replaced according to the invention by smaller rectifiers provided for each one of or for groups drive devices. These smaller rectifiers are mounted adjacent their associated drive devices and, with such a location, it is possible for the rectifier to become efficiently cooled likewise via the robot body structure.

What is claimed is:

1. An industrial robot comprising a manipulator body structure of articulated members mounted for rotative movement about respective axes thereof, drive means at each of said axes to effect the respective rotative movements, each of said drive means comprising at least one electric driving motor capable of operating up to a predetermined maximum temperature without the use of a cooling fan, control equipment means for driving and controlling each of said respective drive means, said respective control equipment means comprising at least one rectifier and drive devices each capable of withstanding heat generated up to a maximum temperature of approximately one-half the predetermined maximum temperature of the motor likewise without the use of any cooling fan, said drive devices being operatively connected respectively to said motors, each of said drive devices being mounted only on selected areas of said body structure other than at each said motor, and each of said drive devices being spaced a predetermined distance from said respective motors to which said drive devices are operatively connected, said body structure thereby functioning to absorb the waste heat generated by said drive devices, to spread the waste heat throughout the body structure, and to transfer the waste heat solely by convection to the ambient air.

2. The industrial robot according to claim 1, wherein each said drive means further comprises a reduction gear means operatively connected respectively to said motors, each said gear means comprising a reduction gear operating in a lubricant and having a gear housing, each said drive devices being mounted directly on said gear housing of each said gear means such that each said gear housing together with the lubricant function to absorb the waste heat generated by the drive devices, to spread the waste heat therethroughout, and to transfer the waste heat solely by convection to the ambient air.

* * * * *